No. 885,861. PATENTED APR. 28, 1908.
J. E. PEPPER.
ARTIFICIAL BAIT.
APPLICATION FILED SEPT. 20, 1907.
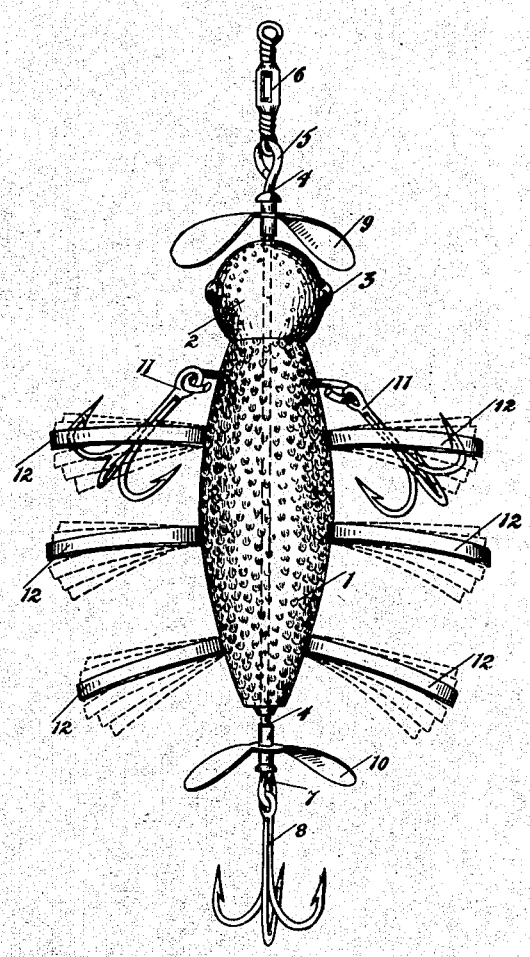
WITNESSES
Chas. A. Xandell
Sarah E. Clark.
INVENTOR
JOSEPH E. PEPPER
BY Robinson, Martin & Jones
ATTORNEYS.

UNITED STATES PATENT OFFICE.

JOSEPH E. PEPPER, OF ROME, NEW YORK.

ARTIFICIAL BAIT.

No. 885,861.     Specification of Letters Patent.     Patented April 28, 1908.

Application filed September 20, 1907. Serial No. 393,763.

*To all whom it may concern:*

Be it known that I, JOSEPH E. PEPPER, of Rome, in the county of Oneida and State of New York, have invented certain new and useful improvements in Artificial Bait; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide an improved and a more efficient bait for catching fish.

The figure of the drawings shows a top or plan view of the device.

The same consists of an elongated or cigar-shaped body 1 having a substantially spherical head part 2, which is preferably provided with glass eyes 3. A spindle 4 extends longitudinally through the body and is provided with an eye 5 and a swivel 6 at its forward end by means of which the device may be drawn, and with an eye 7 and gang hooks 8 at the rear end. Spinners 9 and 10 in the nature of propeller blades are provided on the spindle 4 at the front and rear ends of the body. Attached to the side adjacent to the forward end are also provided gang hooks 11. Projecting laterally from the sides of the body are three or more spring flexible projections in the nature of legs 12. These are of preferably strips of rubber secured in the body. When the bait is drawn through the water in an obvious manner the spinners 9 and 10 run and the projections or legs 12 are forced rearwardly by the water and rebound under their natural elasticity and give the appearance of a live bug or animal. When the fish takes the bait it is expected to be caught upon one or more of the several gangs of hooks mentioned.

What I claim as new and desire to secure by Letters Patent is:

1. The herein described artificial bait, consisting of a cigar-shaped body having a series of laterally projecting flexible spring legs arranged along the sides of the body, and gangs of hooks at the front and rear of the bait, substantially as set forth.

2. The herein described artificial bait consisting of a cigar-shaped body, a substantially spherical head, a series of laterally projecting flexible spring legs arranged along the sides of the body, fore and aft spinners and gangs of hooks at the front and rear of the bait, substantially as set forth.

In witness whereof, I have affixed my signature, in presence of two witnesses, this 16th day of September, 1907.

JOSEPH E. PEPPER.

Witnesses:
    D. F. SEARLE,
    W. G. SHANKENBERY.